United States Patent Office 3,770,688
Patented Nov. 6, 1973

3,770,688
COATING COMPOSITIONS AND PROCESS FOR THE PRODUCTION THEREOF
Karl Hamann, Leonberg, Walter Dittmann, Marl, Paul Sunder-Plassmann, Polsum, and Klaus Gorke, Hullern, Germany, assignors to Chemische Werke Huls Aktiengesellschaft, Marl, Germany
No Drawing. Filed Apr. 21, 1972, Ser. No. 246,134
Claims priority, application Germany, Apr. 23, 1971,
P 21 19 783.1
Int. Cl. C08g 33/10
U.S. Cl. 260—32.8 A                 17 Claims

ABSTRACT OF THE DISCLOSURE

Coating compositions comprising a phenolic adduct of an unsaturated liquid polybutadiene wherein said adduct consists essentially of:

(a) 70–90% by weight of a liquid polybutadiene having, prior to the adduct formation, a viscosity of 200–5,000 cp. at 20° C., a molecular weight of 500–4,000 as determined by vapor pressure osmosis, an iodine number of 400–470 g. iodine/100 g., and double bonds which are 50–95% in the 1,4-cis-configuration; and
(b) 30–10% by weight of phenol, about 5–35% of which is joined to the polybutadiene as a phenyl ether and the remainder is joined thereto ortho- and para- to the phenolic hydroxy group;

said adduct containing 5–35% of the olefinic double bonds of the liquid polybutadiene.

BACKGROUND OF THE INVENTION

This invention relates to coating compositions, more particularly those comprising a phenolic adduct of a liquid polybutadiene, and to a process for their production.

Adducts of phenols and olefinically unsaturated polymers have been employed as a component of coating compositions.

In U.S. Pat. 3,391,115, adducts of phenols, particularly bisphenol A, and homo- or copolymers of butadiene are described. These adducts, however, have a very limited range of application. Also, the coatings can be obtained only by baking at about 200° C. using driers.

British Pat. 1,106,267 discloses coating compositions comprising adducts of copolymers of isoprene and phenol. Copolymers of isoprene, however, can be produced only with difficulties and therefore are expensive.

This invention is directed to means for avoiding the disadvantages of the relevant state of the art by employing phenolic compositions comprising a phenolic adduct of polybutadienes as defined hereinafter.

SUMMARY OF THE INVENTION

The coating compositions of this invention comprise a phenolic adduct of an unsaturated liquid polybutadiene wherein said adduct consists essentially of:

(a) 70–90% by weight of a liquid polybutadiene having, prior to the adduct formation, a viscosity of 200–5,000 cp. at 20° C., a molecular weight of 500–4,000 as determined by vapor pressure osmosis, an iodine number of 400–470 g. iodine/100 g., and double bonds which are 50–95% in the 1,4-cis-configuration; and
(b) 30–10% by weight of phenol, about 5–35% of which is joined to the polybutadiene as a phenyl ether and the remainder is joined thereto ortho- and para- to the phenolic hydroxy group;

said adduct containing 5–35% of the olefinic double bonds of the liquid polybutadiene.

DETAILED DISCUSSION

The phenolic adducts employed in the coating compositions of this invention, have very specific chemical composition, structure and physical properties.

Suitable starting liquid polybutadienes for the adduct formation are those which are at least 97% linear, i.e., polymerized by 1,4-linking, which have a viscosity at 20° C. of from 200 to 5,000 cp., preferably from about 300 to 3,000 cp.; a molecular weight as determined by vapor pressure osmosis, of from 500 to 4,000, preferably about 800 to 2,000; an iodine number of from 400 to 470, preferably about 420 to 465 g. iodine/100 g., and whose double bonds are 50–95%, preferably about 55–85%, in the 1,4-cis-configuration. Especially suitable are liquid polybutadienes having a viscosity of 400–850 cp. at 20° C., a molecular weight, as determined by vapor pressure osmosis, of 1,000–1,800, an iodine number of 440–465 g. iodine/100 g., and whose double bonds are 65–80% in the 1,4-cis-configuration, 19–35% in the 1,4-trans-configuration, and 0–1% are vinyl double bonds. Such polybutadienes can, for example, be produced according to the procedure described in German Pats. 1,186,631 and 1,292,853.

The adducts employed in the coating compositions of this invention are also specific as to their chemical structure. Thus, about 5–35%, preferably about 10–30%, of the phenol component is joined to the polybutadiene component as a phenyl ether, and 95–65%, preferably 90–70%, is joined to the polybutadiene in the o- and p-position with respect to the phenolic hydroxy group.

The adducts of the compositions of this invention contain about 5–35%, preferably about 10–25%, of the olefinic double bonds originally present in the liquid polybutadiene prior to adduct formation. Therefore, reaction conditions for the adduct formation must be selected so that the double bonds which are not consumed by the addition of phenol to the polybutadiene are not completely eliminated by cyclization, i.e., by the formation of cycloaliphatic rings.

In accordance with a preferred embodiment of this invention, the coating compositions are produced by reacting the selected liquid polybutadiene with phenol at a temperature from about 90 to 185° C., preferably 105–130° C., in the presence of about 0.05–2% by weight, based on the liquid polybutadiene, of an acidic catalyst, and optionally in the presence of an organic solvent.

The phenol content of the adduct for the most part is dependent upon the ratio of phenol to liquid polybutadiene in the reaction charge. To produce an adduct consisting of 10–30% by weight of the phenolic component, 1–2 parts by weight of the selected liquid polybutadiene and 1–2 parts by weight of phenol is generally employed. Preferably a ratio of reactants is employed which produces an adduct consisting of 15–25% of the phenol.

As is known, acidic catalysts are required for the addition of phenol to a liquid polybutadiene. Suitable catalysts are, for example, trifluoromethanesulfonic acid and, in particular, perchloric acid. Preferably, a 60–74% by weight aqueous perchloric acid or a 60–100% by weight aqueous trifluoromethanesulfonic acid is utilized. If the adduct formation is conducted in the absence of a solvent, boron trifluoride, for example, is also suitable as a catalyst.

The reaction catalysts are generally employed in amounts of about 0.05–2% by weight, preferably about 0.1–6% by weight, based on the liquid polybutadiene.

The reaction temperature which is suitably adjusted by the reflux rate of the solvent, of the solvent mixture and/or of the phenol, usually is 90–185° C., preferably about 105–130° C.

A reaction solvent generally can be omitted if the molecular weight of the liquid polybutadiene (determined by vapor pressure osmosis) is smaller than about 2,000 and the phenol:liquid polybutadiene weight ratio is at least 1.5:1.

Suitable reaction solvents are the aromatics, e.g., benzene, xylene and chlorobenzene and the chlorinated aliphatic hydrocarbons, e.g., 1,1,2,2-tetrachloroethane, separately or in mixture with each other. Toluene is preferred because its boiling point pemits a partial removal of the high heat of reaction by reflux cooling within a temperature range which is especially advantageous for the adduct formation.

The optimum quantitative ratio of solvent: liquid polybutadiene, which ratio normally is between about 1:1 and 5:1 (parts by volume:parts by weight), generally depends on the molecular weight of the liquid polybutadiene employed and on the weight ratio of phenol:liquid polybutadiene employed, i.e., the higher the molecular weight of the liquid polybutadiene and the lower the weight ratio of phenol:liquid polybutadiene, the higher should be the solvent:liquid polybutadiene ratio. The use of a solvent primarily is to prevent a gelling of the reaction charge, since gel particles in the reaction product have an adverse effect on the properties of the adduct when used in a coating composition.

The reaction time for the adduct formation is dependent to a large extent on the type and amount of the catalyst used and on the reaction temperature. Generally, the reaction time is between about 15 minutes and 6 hours. In any event, a reaction time must be employed which produces an adduct having the combination of the chemical composition, structure and physical properties required for the coating compositions of this invention.

The adducts can be produced in either a batchwise or continuous manner. The ability of the adducts to be produced continuously is of special advantage.

The adducts can be worked up in accordance with conventional techniques. The excess phenol and solvent can be distilled off, optionally under reduced pressure. For this purpose, devices such as thin-film evaporators or rotary evaporators are advantageously employed. For the production of additional adducts, it is then merely necessary to replenish the consumed amount of phenol, the liquid polybutadiene and the catalyst. This mode of operation is also possible when the adduct formation is conducted in the absence of a solvent. The reaction product can also be precipitated adavntageously under agitation. A suitable precipitant, for example, is methanol. In the absence of solvent, water can also be used.

When the precipitated product is obtained in a highly viscous form, rather than in a solid, finely particulate form, so that it cannot be filtered by means of a suction filter, desirably it is again dissolved in an appropriate solvent, such as, for example, chloroform, and again precipitated. Prior to or during the working-up step, it is also advantageous to remove the acidic catalyst or at least render it inactive. This can be done by means of an anion exchanger in free hydroxy form, by neutralization with an alkali hydroxide, e.g., sodium or potassium hydroxide, with an alkali salt of a weak acid, e.g., sodium carbonate or sodium acetate, with ammonia, or with an amine, e.g., triethylamine. In this way, the danger of cross-linking during the working-up step or during storage is avoided.

To produce the coating compositions of this invention, the thus-produced adducts of phenol and a liquid polybutadiene are mixed with a plasticizer, optionally dissolved in a suitable solvent. A particularly advantageous plasticizer is bis-(β-phenoxyethyl)formal ("Desavin," Farbenfabriken Bayer), employed in amounts of about 15–30% by weight, preferably about 20–25% by weight, based on the mixture of the adduct and plasticizer. Other suitable plasticizers are esters of phthalic acid and chlorinated diphenyl ("Chlophen" A60, Farbenfabriken Bayer).

The coating compositions of this invention are suitable for the production of coatings on materials of all kinds, particularly metals and especially metal sheets. For coating the articles, a great variety of procedures can be employed. For example, the coating of metal sheets can be effected by roll coating or powder coating, if it is desired to do so without a solvent. As solvent solutions, the coating compositions can be applied by hand as well as by spray coating or dip coating methods. Suitable solvents are the aromatics, esters, ketones and the chlorinated hydrocarbons, preferably xylene. The coating composition is employed in the solvent solution at a concentration of about 25 to about 75% by weight, preferably 45–65% by weight.

The coating compositions of this invention optionally can contain the conventional additives and auxiliary agents, for example, pigments, coloring agents, flow agents, corrosion-protective agents, and optionally other binders, e.g., alkyd resins and drying oils.

The coating compositions of this invention, which are produced from readily obtainable and inexpensive starting materials, are distinguished particularly by the fact that, as physically drying coating compositions which are subject to the advantageous oxidative secondary cross-linking, they result in coatings of excellent hardness, permanent elasticity and adhesion. Above all, they are capable of surpassing, with respect to their spectrum of properties, coating compositions based on cyclorubbers or chlorinated rubbers presently customarily employed for coating of metallic surfaces.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

PRODUCTION OF AN ADDUCT FROM LIQUID POLYBUTADIENE AND PHENOL 500 g. of phenol, 500 g. of "Polyoel Huels 110" (liquid polybutadiene; Chemische Werke Huels A.G.) having a viscosity of 750 cp. at 20° C., an iodine number of 450 g. iodine/100 g., a molecular weight of 1,400 (determined by vapor pressure osmosis), a double bond distribution of about 75% 1,4-cis, about 25% 1,4-trans, and less than 1% vinyl groups, and 1.5 liters of toluene are combined and heated until the toluene begins to reflux. During the course of about one-half hour, under agitation, a mixture, liquid at room temperature, of 1.25 ml. of 70% by weight aqueous perchloric acid, 20 g. of phenol, and 5 ml. of toluene are added at a rate such that the reaction can be kept under control by slight reflux, so that the agitation is continued for another four hours under slight reflux. After cooling to about 100° C., a solution of 5 g. of anhydrous soda (sodium carbonate) in 50 ml. of water is gradually added under stirring. Using an "Ultra-Turrax" mixer, after cooling to about 50° C., the reaction mixture is stirred into 20 liters of methanol. A solid, finely divided product is thus-obtained which is vacuum-filtered using a suction filter. Thereafter, the solid product is stirred up twice in 5 liter portions of methanol, then with a mixture of 2.5 liter of methanol and 2.5 liter of water and, finally, with 5 liter of methanol, in each case followed by vacuum-filtration on the suction-filter.

After drying in air and in a water-jet aspirator at room temperature, about 600 g. of a light-yellow powder is obtained having the following analysis:

3.25% oxygen≃19% phenol
RSV value (3 g./100 ml. toluene; 25° C.): 0.16
IR analysis (in carbon disulfide according to R. R. Hampton, Anal. Chem. 21, p. 923 [1949]):
    18% of the original olefinic double bonds still present,
    23% of the phenol is present as phenyl ether, the remainder as o- and p-substituted phenol. The calibration of the extinction for phenyl ether and o- and/or p-substituted phenol was effected with sec.-butylphenyl ether, o-sec.-butylphenol, and p-sec.-butylphenol.

PRODUCTION OF THE COATING COMPOSITIONS 77.5 parts by weight of an adduct of this invention and 22.5 parts by weight of bis-(β-phenoxyethyl)formal are dissolved in 67 parts by weight of xylene under agitation. Clear, homogeneous varnish solutions are produced.

PREPARATION AND TESTING OF THE COATINGS

The coating compositions of this invention are applied to glass plates and deep-drawn metal sheets by means of a 100μ scraper. The coatings are tested after aging for 16 days at 70° C. The characteristics examined are the pendulum hardness according to Koenig in seconds on glass (DIN [German Industrial Standard] 53,157), as well as the Erichsen depression test (DIN 53,156), and the adhesion to deep-drawn metal sheet. The adhesion is examined by oblique ruling [grid] cut (45°), pressure application of adhesive film, tearing it off, and evaluation according to DIN 53,151.

For comparison purposes, in the same manner, coatings are produced from coating compositions consisting of 70 parts by weight of "Cyklosit" (cyclorubber of Fabrenfabriken Bayer) and 30 parts by weight of bis-(β-phenoxyethyl)formal in 67 parts by weight of xylene (comparison product A), or consisting of 50 parts by weight of "Pergut" S10 (chlorinated rubber of Farbenfabriken Bayer), 45 parts by weight of "Chlophen A60" (chlorinated diphenyl of Farbenfabriken Bayer) and 5 parts by weight of bis-(β-phenoxyethyl)formal in 67 parts by weight of xylene (comparison product B). These coatings are likewise tested after aging for 16 days at 70° C., in accordance with the above-mentioned methods.

TEST RESULTS

In the table below, the test results obtained in connection with a number of coatings are compiled. The technical advance in the art provided by the coating compositions of this invention as compared to commercially available comparison products can clearly be seen therefrom, viz., the great improvement in permanent elasticity (numerical values of Erichsen depression) with excellent hardness and very good adhesion.

TABLE

| Number | Composition of the adduct | | Phenol bond | | Residual adduct olefinic double bonds, percent | Film thickness, μ | Pendulum hardness, sec. | Erichsen depression, mm. | Adhesion | RSV value (3 g./100 ml. toluene, 25° C.) |
|---|---|---|---|---|---|---|---|---|---|---|
| | Liquid polybutadiene, percent by wt. | Phenol percent by wt. | Phenyl ether, percent | o- and p-subst. phenol, percent | | | | | | |
| 1 | 85.5 | 14.5 | 27 | 73 | 26 | ea. 25 | 147 | 9.7 | Very good | 0.15 |
| 2 | 84.5 | 15.5 | 13 | 87 | 12 | ea. 25 | 192 | 6.9 | do | 0.23 |
| 3 | 80.5 | 19.5 | 27 | 73 | 22 | ea. 32 | 188 | 8.0 | do | 0.14 |
| 4[1] | 81 | 19 | 23 | 77 | 18 | ea. 30 | 186 | 9.4 | do | 0.16 |
| 5 | 77 | 23 | 23 | 77 | 17 | ea. 35 | 177 | 9.7 | do | 0.13 |
| 6 | 77.5 | 22.5 | 13 | 87 | 10 | ea. 32 | 213 | 9.7 | Good | 0.14 |
| A | | | | | | ea. 26 | 126 | 0.7 | do | |
| B | | | | | | ea. 22 | 190 | 1.0 | Satisfactory | |

[1] Product of the example for preparing the coating composition.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coating composition comprising a phenolic adduct of an unsaturated liquid polybutadiene wherein said adduct consists essentially of:
   (a) 70–90% by weight of a liquid polybutadiene having, prior to adduct formation, a viscosity of 200–5,000 cp. at 20° C., a molecular weight of 500–4,000 as determined by vapor pressure osmosis, an iodine number of 400–470 g. iodine/100 g., and double bonds which are 50–95% in the 1,4-cis-configuration; and
   (b) 30–10% by weight of phenol, about 5–35% of which is joined to the polybutadiene as a phenyl ether and the remainder is joined thereto ortho- and para- to the phenolic hydroxy group; said adduct containing 5–35% of the olefinic double bonds of the liquid polybutadiene.

2. A coating composition according to claim 1, wherein the liquid polybutadiene has a viscosity of 300–3,000 cp. at 20° C., a molecular weight of 800–2,000 as determined by vapor pressure osmosis, and an iodine number of 420–465 g. iodine/100 g., and 55–85% of whose double bonds are in the 1,4-cis-configuration.

3. A coating composition according to claim 2, wherein the liquid polybutadiene has a viscosity of 400–850 cp. at 20° C., a molecular weight of 1,000–1,800 as determined by vapor pressure osmosis, and an iodine number of 440–465 g. iodine/100 g., and 65–80% of whose double bonds are in the 1,4-cis-configuration, 19–35% in the 1,4-trans-configuration and 0–1% are vinyl.

4. A coating composition according to claim 1, wherein the adduct contains 25–15% by weight of phenol.

5. A coating composition according to claim 1, wherein 10–30% of the phenol is present in the adduct as a phenyl ether and the remainder is joined ortho- and para- to the phenolic hydroxy group.

6. A coating composition according to claim 1, wherein 10–25% of the olefinic double bonds of the liquid polybutadiene are present in the adduct.

7. A coating composition according to claim 3, wherein the adduct contains 25–15% by weight of phenol.

8. A coating composition according to claim 7, wherein 10–30% of the phenol is present in the adduct as a phenyl ether and the remainder is joined ortho- and para- to the phenolic hydroxy group.

9. A coating composition according to claim 8, wherein 10–25% of the olefinic double bonds of the liquid polybutadiene are present in the adduct.

10. A coating composition according to claim 1, wherein a plasticizer is present in an amount of 15–30% weight, based on the mixture of plasticizer and adduct.

11. A coating composition according to claim 10, wherein the plasticizer is present in an amount of 20–25% by weight, based on the mixture of plasticizer and adduct.

12. A coating composition according to claim 11, wherein the adduct contains 25–15% by weight of phenol.

13. A coating composition according to claim 12, wherein 10–30% of the phenol is present in the adduct as a phenyl ether and the remainder is joined ortho- and para- to the phenolic hydroxy group.

14. A coating composition according to claim 13, wherein 10–25% of the olefinic double bonds of the liquid polybutadiene are present in the adduct.

15. A coating composition according to claim 10, wherein the plasticizer is bis-(β-phenoxyethyl) formal.

16. A coating composition according to claim 1, comprising a solvent selected from the group consisting of aromatics, esters, ketones and chlorinated hydrocarbons.

17. A coating composition according to claim 16, wherein the solvent is xylene.

References Cited

UNITED STATES PATENTS 3,391,115   7/1968   Kuenstler _____ 260—59

FOREIGN PATENTS 1,106,267   4/1968   Great Britain _____ 260—62

ALLAN LIEBERMAN, Primary Examiner

P. R. MICHL, Assistant Examiner

U.S. Cl. X.R.

260—33.2 R, 33.6 A, 47 UP